United States Patent
Weidner

(10) Patent No.: US 7,365,876 B2
(45) Date of Patent: Apr. 29, 2008

(54) METHOD FOR GENERATING A COLOR MATCH BETWEEN A TARGET OBJECT AND A SOURCE OBJECT

(75) Inventor: Michael Weidner, Heuchelheim (DE)

(73) Assignee: CGS Publishing Technologies International GmbH, Hainburg (DE)

(*) Notice: Subject to any disclaimer, the term of this patent is extended or adjusted under 35 U.S.C. 154(b) by 1033 days.

(21) Appl. No.: 10/607,590

(22) Filed: Jun. 27, 2003

(65) Prior Publication Data
US 2004/0066967 A1 Apr. 8, 2004

(30) Foreign Application Priority Data
Oct. 2, 2002 (DE) .............. 102 46 253

(51) Int. Cl.
*G06K 15/00* (2006.01)
(52) U.S. Cl. .......... 358/1.9; 358/518; 358/520
(58) Field of Classification Search ........ 358/1.9, 358/518, 520; 382/162, 167
See application file for complete search history.

(56) References Cited

U.S. PATENT DOCUMENTS

| | | | | |
|---|---|---|---|---|
| 5,692,071 A * | 11/1997 | Govaert | .............. | 382/167 |
| 6,606,166 B1 * | 8/2003 | Knoll | .............. | 358/1.9 |
| 6,924,908 B1 * | 8/2005 | Kimia | .............. | 358/1.9 |
| 7,046,396 B2 * | 5/2006 | Chan | .............. | 358/1.9 |
| 2002/0051159 A1 * | 5/2002 | Tamagawa | .............. | 358/1.9 |
| 2004/0114165 A1 * | 6/2004 | Nakajima | .............. | 358/518 |

FOREIGN PATENT DOCUMENTS

| | | |
|---|---|---|
| DE | 3903981 | 4/1998 |
| DE | 4104537 | 5/1999 |
| EP | 0119836 | 9/1984 |
| JP | 10-032725 A | 2/1998 |
| JP | 11-262033 A | 9/1999 |
| WO | 9112500 | 8/1991 |
| WO | 0175406 | 10/2001 |

* cited by examiner

*Primary Examiner*—Kimberly A. Williams
(74) *Attorney, Agent, or Firm*—Friedrich Kueffner

(57) ABSTRACT

In a method for generating a color match between a target object having a plurality of different target color values and a source object, a target color space with target color locations to be correlated with target color values is generated for the target object. For the source object, a source color space having a plurality of source color locations is generated, wherein the source color locations are correlated with a source color value, respectively. For each target color location a position in the vicinity of a similar source color location is determined within the source color space. The spacing of this position from the similar source color location is determined, and, based on the spacing, the source color value correlated with the similar source color location is changed.

9 Claims, 2 Drawing Sheets

METHOD FOR GENERATING A COLOR MATCH BETWEEN A TARGET OBJECT AND A SOURCE OBJECT

BACKGROUND OF THE INVENTION

1. Field of the Invention

The invention relates to a method for generating a color match between a target object having numerous different target color values and a source object.

2. Description of the Related Art

When printing on materials, such as paper or textiles, a certain coloring should be obtained generally. For this purpose, certain color values are preselected. The color value is a certain mixing ratio of primary colors. A known system of basic colors is YMCK, i.e., yellow (Y), magenta (M), cyan (C, blue), and key (K, black). However, it has been observed frequently that an observer perceives same color values very differently when the printing conditions differ from one another. Differences may result, for example, from different printing methods. For example, offset printing can cause for the same color value a different appearance than letter press printing or intaglio printing. Under certain circumstances, the reproduction by inkjet printing, which is used, for example, for proofing, i.e., for checking a printer's copy, can result in a different perception as compared to the final print produced later. Even for identical printing methods, differences may occur when the printing is carried out at different times, at different locations, or with different printing inks.

In order to explain the invention, proofing is used as an example in the following. Proofing refers to the checking of the printing data with respect to color and correct contents. The results of printing and of proofing should always be the same with respect to color and with respect to contents. The following explanation is limited, of course, to the matching of colors.

For evaluating correct colors of prints, there are different error standards, in particular, ΔE, ΔE94, and ΔE2000. These error standards quantify spacings in multi-dimensional color spaces. The object is to keep the differences between source color location and target color location, which are calculated with these error standards, as small as possible. In order to achieve this goal, conventionally manual corrections within the method for producing the print are carried out. This requires experienced personnel who "know" how to change the color value in a source object in order to obtain the same color perception as in the target object. However, these methods are very complex. They are also very time-consuming.

SUMMARY OF THE INVENTION

It is an object of the present invention to reduce the expenditure for generating a color match.

In accordance with the present invention, this is achieved in that:

a) for the target object a target color space is generated with target color locations to be correlated with the target color values;

b) for the source object a source color space with a plurality of source color locations is generated, of which each one is correlated with a source color value, respectively;

c) for each target color location a position in the vicinity of a similar source color location is determined in the source color space;

d) a spacing of that position from the similar source color location is determined; and e) based on this spacing, the source color value correlated with the similar source color location is changed or adjusted.

The term "color location" in the following is used as a parameter which corresponds to the color perception. For example, a measured spectral distribution of a color can be converted into a color location. The color locations are arranged in a multi-dimensional color space, which is typically three-dimensional.

Accordingly, a target color space for the target object is generated. This target color space is essentially the fingerprint of a printing device, for example, a printing press, a copier, or an inkjet system whose color reproduction is to be simulated as best as possible. This target color space, in principle, must be generated only once. However, it may be indicated that such a target color space be produced again from time to time when, for example, the conditions of the surroundings change. The target color space is generated, for example, in that a "color chart" is produced on which a plurality of test fields with different color values are provided. The greater the number of the color values, the better the control of the color matching action. To specify a range, 1,000 fields with different colors are generated. Each field is then correlated with a color value which is comprised, for example, of four colors (YMCK) and accordingly is four-dimensional.

A similar source color space is generated for the source object, i.e., a color chart is produced on a different printing device, at a different time, or by means of a different method. The two color charts are then most likely different from one another. It is expedient, but not mandatory, to provide the color chart of the source object with the same number of color fields as the color chart of the target object.

In order to be able to reproduce the source object like the target object, for each color location of the target object, i.e., for each color field, a color location in the source object is selected which must match the target color location as closely as possible. Expressed in simpler terms, on the color chart of the source object a color field is selected which is as similar as possible to a certain color field of the color chart of the target object. This color field of the source object possibly has a different coordinate than the corresponding color field of the target object. When both color fields coincide, it is known which color value, i.e., which mixing ratio of primary colors is to be used in order to obtain a certain color reproduction corresponding to the color reproduction of the target object.

However, this case will always be an exception. An exact matching will not result in most cases. However, based on the spacing between the two color locations in the color space, it can be derived how the color value, i.e., the mixing ratio of the colors, must be changed in the source object so that a color reproduction as similar as possible to that of the target object can be obtained.

Accordingly, the information in regard to the spacing of color locations of the color space is used to change the color values.

Preferably, the steps b) through e) are repeated until either a predetermined number of repetitions has been reached or the spacing has dropped below a predetermined error value. The correlation between the color values and the color locations is highly non-linear, i.e., a simple linear correction in most cases will not lead to a completely satisfying result. Therefore, matching is iteratively approached in that the aforementioned steps are repeated once or several times. In most cases, an excellent approximation of the color locations of the target object and of the source object will result already after a few steps. In order to keep the processing expenditure within predetermined limits, the number of the iteration steps can be limited.

Preferably, beginning with the first repetition, source color locations of source color spaces of previous determinations are used. In this way, more color locations of the source object are available with which a certain color location of the target object can be compared. The chance that a "matching" color location will be found in the source object is increased in this way. The information in regard to individual color values of the color locations are available, i.e., they are not lost. In this way, the chance of matching the correct color value is increased because the envelope of the source color locations around a certain target color location and thus the range of possible source color locations is reduced.

Preferably, the source color spaces of all preceding determinations are used. Even though with each step or repetition the expenditure will increase, because the color locations of the target object must be compared with a correspondingly greater number of color locations of the source object, the higher processing expenditure however will show its effect in improved results.

Preferably, for the target color location several source color locations are determined which envelope the target color location, wherein one of these source color locations forms the similar source color location. This is a relatively simple criterion in order to determine the "coordinates" of the target color location in the source color space. In the two-dimensional color space, three points would be selected, for example, which describe a triangle in which the color locations of the target color space is located. In a three-dimensional color space, a tetrahedron is formed accordingly. For color spaces with even more dimensions corresponding geometric figures can be determined which provide an envelope for a certain color location. It is then possible to employ one of the corner points in order to define the similar color location of the source.

Preferably, a linear combination with linear factors is formed of the enveloping source color locations, and these linear factors are used for changing the source color value corresponding to the similar source color location. Because of the enveloping source color locations, the "coordinates" of the target color location in the source color space are fixed. These coordinates can be determined by means of the enveloping source color locations. The enveloping source color locations are determined by predetermined color combinations. It is then possible to determine the "spacing" between two enveloping source color locations by a ratio corresponding to the difference between the target color location and the source color location, and a corresponding correction of this color value can be performed. In particular for an iterative method, this correction, sooner or later, will result in an excellent approximation of the source color location relative to the target color location.

Preferably, a black content is determined when generating the color spaces. The black content of a color is the content of black in a ratio to the total application of all colors. In this way, a fourth dimension is introduced for the color spaces, i.e., that of the black content. However, it is possible to more precisely reproduce colors, in particular, while taking into consideration the black content.

Preferably, the color values are represented as a four-dimensional field and the color spaces as a three-dimensional field when the black content is not taken into account and as a four-dimensional field when the black content is taken into account.

Preferably, the color locations are determined based on the color values by means of a spectroscopic method. A spectroscopic method provides, for example, a spectral analysis of each color value, i.e., for each field on the color chart. The spectral distributions are converted into the color location. By means of the measurement and because of the fact that the color fields have correlated therewith fixed four-dimensional color values, a representation in a mathematical sense is provided.

DESCRIPTION OF THE PREFERRED EMBODIMENTS

Figure 1:
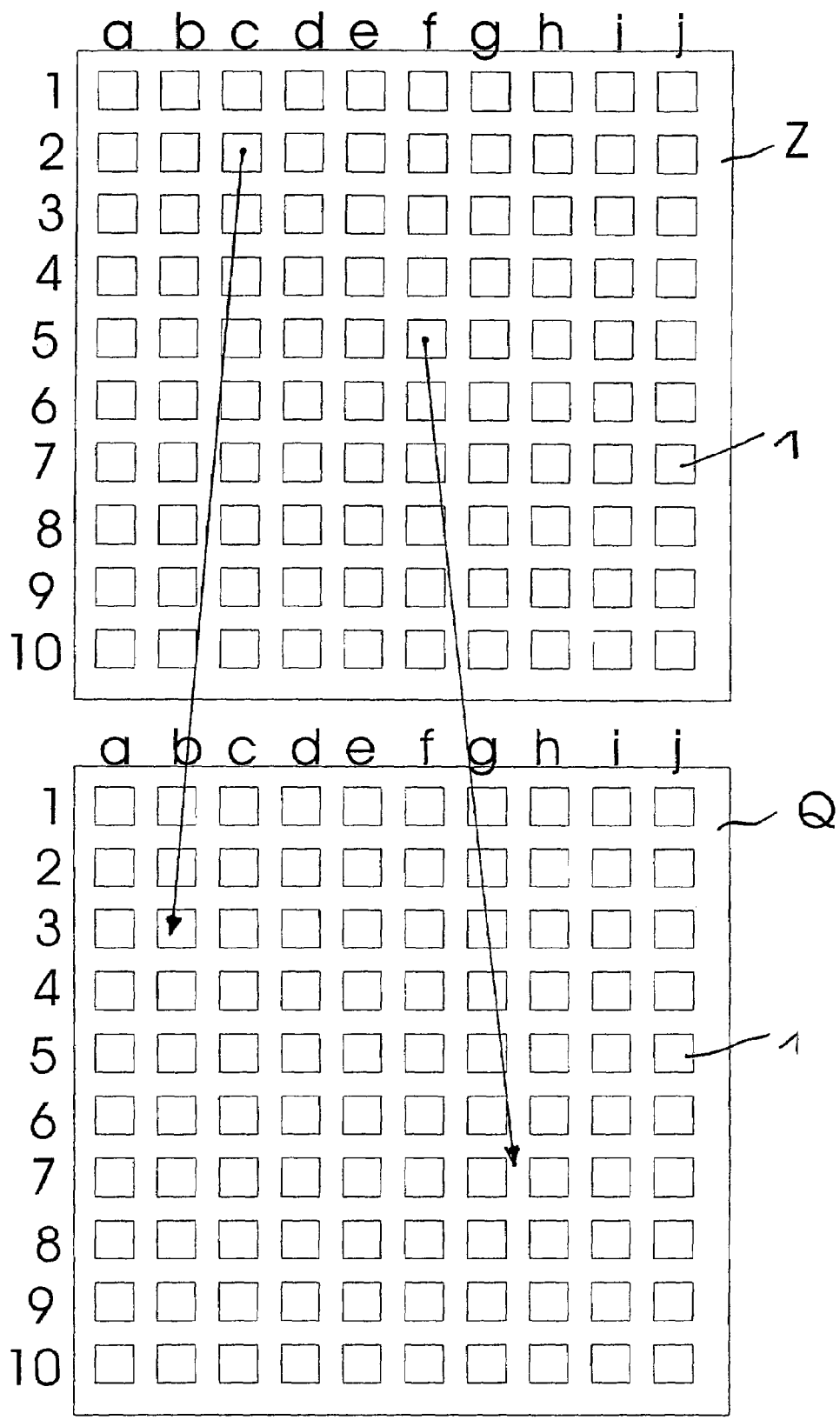
FIG. 1 is a schematic representation of two color charts.

FIG. 1 shows schematically two color charts: a color chart Z for a target object and a color chart Q for a source object. Both color charts Z, Q have in the present case 100 color fields 1 which differ with respect to their colors. These color fields can be described by coordinates. For this purpose, horizontally the letters a through j are provided and vertically the numbers 1 through 10. When the color charts Z, Q have been produced by means of different printing devices or different inks or different methods or other different conditions, they will generally differ from one another.

In reality, the color charts Q, Z will, of course, have significantly more color fields than the 100 fields illustrated here. Such color charts have color fields in the range of 1,000 and more.

It is desired to represent by means of the source object Q the colors such that they are perceived in the same way as in the case of the target object. This is achieved in the following way.

Figure 2:
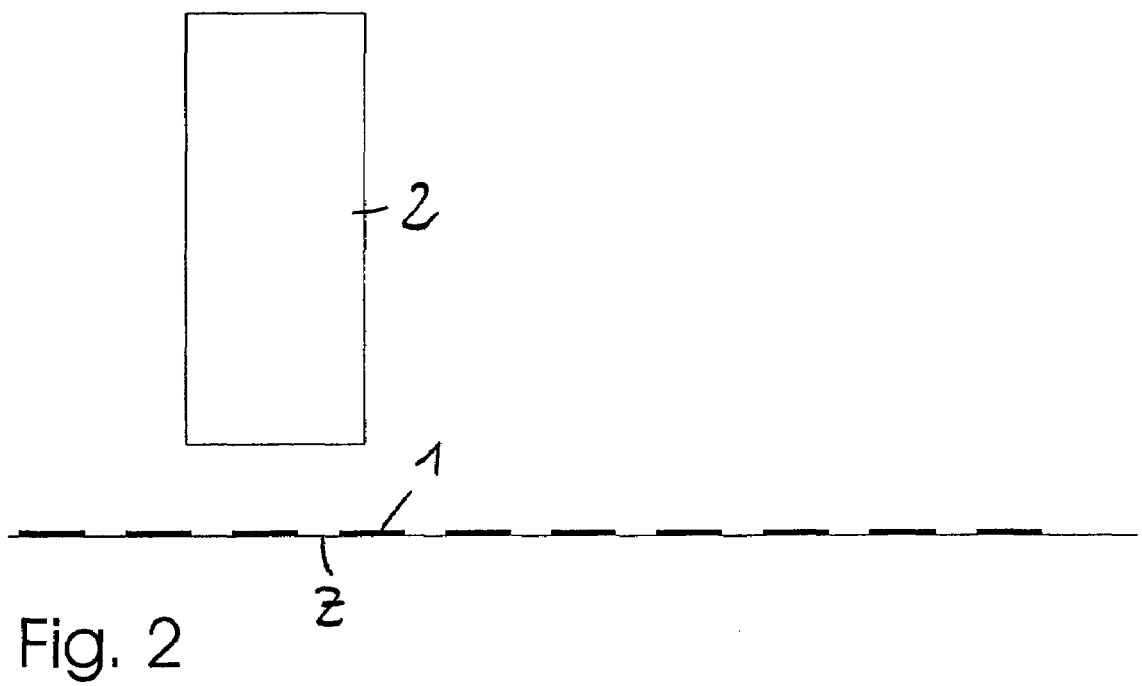
FIG. 2 is a schematic illustration of a measuring device.
Figure 3:
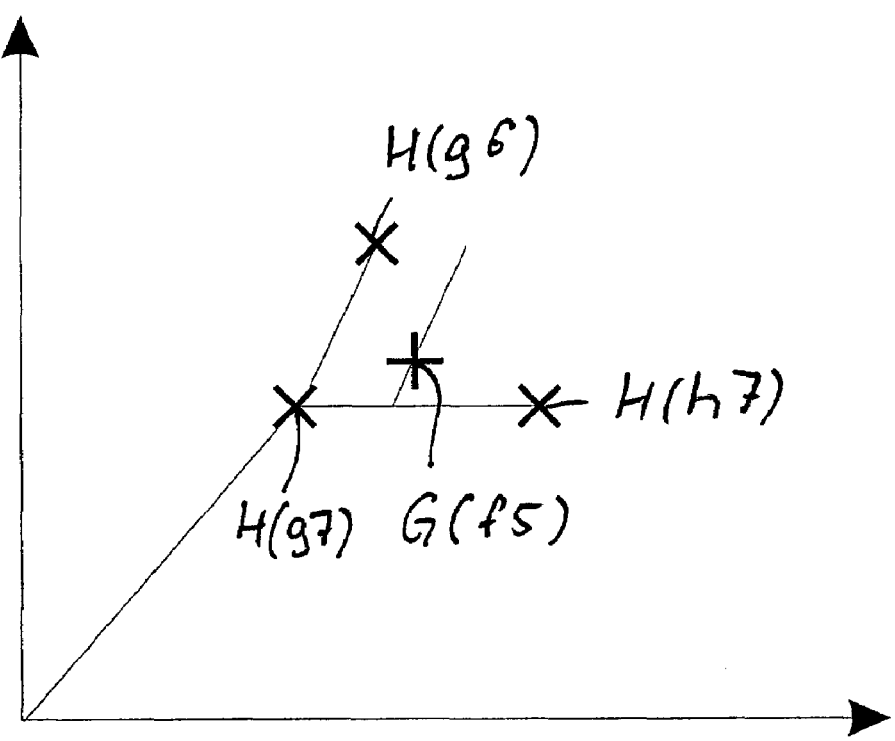
FIG. 3 is a schematic illustration for determining the linear factors.

By means of a spectrophotometer 2 (FIG. 2), a spectral analysis is prepared for each color field 1 of the color chart Z of the target object. The measured spectral distribution is then converted into a color location in a multi-dimensional color space (typically three-dimensional) and stored/saved.

A color field 1 is defined by its color values, i.e., the mixing ratio of four primary colors. This is a representation of the four-dimensional color values in a three-dimensional color space. This representation can be illustrated by the following equation:

$$F(y,m,c,k)=L,a,b$$

The letters y, m, c, k represents the color contents of yellow, magenta, cyan, and black.

Expediently, the dimensions L, a, b of the color locations are supplemented by an additional dimension. This supplement ensures that later on the black content of a color is maintained. The black content S of a color is to be understood as the content of black in comparison to the total application of all colors. It is determined by the following equation:

$$S = \frac{K}{Y * g_y + M * g_m + C * g_c + K}$$

In this context, $g_y$, $g_m$, $g_c$ are weights with which the individual colors contribute to the total density.

For a predetermined color value, i.e., a color field 1 on a color chart, the correlated color locations are generally different when the printing conditions change. For example, differences result because of different printing methods, different locations, different times or other conditions of the surroundings or other materials to be printed. When the parameters of the different printing methods, locations, times or colors are named G and H, this situation can be represented as follows:

$$G(x) \neq H(x)$$

For this reason, the above-mentioned conversion of color locations into one another is required. This conversion is expressed by the following equation:

$$G(I(x)) = H(x)$$

However, the function I generally also contains certain inaccuracies. Therefore, this equation more precisely should be written as follows:

$$G(I(x)) \approx H(x)$$

In order to obtain a satisfactory match, the function I must be optimized. This is achieved in the following way.

On the color chart Z a fixed number of color fields 1 with corresponding color values is provided. In the present embodiment this number is 100 color fields.

After a complete measurement by means of the spectrophotometer 2, for each color field 1 a color location in a four-dimensional color space is obtained, respectively. In this case, 100 color locations are thus provided.

The same examination is carried out for the color chart Q of the source object, i.e., for a different printing method.

It is then examined whether for the individual color locations of the target object Z a corresponding color location in the source object Q can be found. This must not necessarily mean that the corresponding match is at the same location. For example, the color location which corresponds to the color field c2 in the color chart Z can be similar to the color location which is at the coordinate b3 in the color chart Q of the color object. It is thus known that for generating a color field which corresponds to the color field c2 on the target object, a color mixture is required which corresponds to the color field b3 of the source object.

Such a match will however result only in exceptional situations. In general, the source object will not have a color location which is identical to the color location on the target object Z. However, similar fields can be found in the source object. This is shown in the illustrated embodiment in that the color field f5 of the color chart Z of the target object would have a match somewhere between the color fields g7 and h7 of the color chart Q of the source object.

However, the individual color fields will not be compared with one another but instead the color locations which correspond to these color fields. These color locations are provided in a three-dimensional or four-dimensional space. In order to simplify the explanation, only a two-dimensional space is considered. However, a person skilled in the art can easily determine how this situation is to be expanded to a multi-dimensional space.

For the color location G(f5)—since this is a two-dimensional consideration—there are three color locations H(g7), H(h7), H(g6) which form an envelope about the color location G(f5). In a three-dimensional space, there are of course four points which enclose like a tetrahedron or a hypertetrahedron the color location G.

Based on the position of the color location G(f5) within the envelope, linear factors can be determined. For example, the location G is located approximately at 40% of the distance between the color locations H(g7) and H(h7) and at 20% of the distance between H(g7) and H(g6). When these linear factors are applied to the color values, on which the color location H(g7) is based, a new color value is obtained which, upon new spectroscopic examination, results in a color location H'(g7). The color location H(g7) in the present case is considered to be the similar color location, i.e., it is the most similar to the color location G(f5).

When, for example, the color location corresponding to the color field g7 has a content of 70 of the color magenta, and the color field h7 has a magenta content of 80, for a new color field a magenta content of 74 will be selected because the color location G(f5) is spaced from the color location H(g7) at 40% of the spacing between H(g7) and H(h7).

With respect to the other colors, the same operations will be carried out. The illustration has been simplified purposely for explanatory reasons. For the determination of the spacing between the individual color locations, it is, of course, possible to employ other mathematical methods.

Since the correlation between the color values and the color locations generated by the different printing methods is non-linear to the highest degree, the probability that after a single correction a color match is indeed obtained, is relatively small. Therefore, the method is repeated as often as needed until the spacings between G and H drop below a predetermined error value or a predetermined number of repetitions has been reached. In this way, for each new measuring process a new color chart is obtained, i.e., after the first correction there are no longer 100 color locations of the source available but already 200, which can be compared to 100 color locations of the target object. For each repetition, the number is increased by 100. In this way, the chance of finding a (matching) color location at the source object increases because the envelope, comprised of source color locations about a predetermined target color location, and thus the range of the possible source color values becomes smaller.

The results are two prints which differ from one another only within the limit values of the error standard.

While specific embodiments of the invention have been shown and described in detail to illustrate the inventive principles, it will be understood that the invention may be embodied otherwise without departing from such principles.

What is claimed is:

1. A method for generating a color match between a target object having a plurality of different target color values and a source object, the method comprising the steps of:
    a) generating for the target object a target color space with target color locations to be correlated with target color values;
    b) generating for the source object a source color space having a plurality of source color locations, wherein the source color locations are correlated with a source color value, respectively;
    c) determining for each target color location within the source color space a position in the vicinity of a similar source color location;

d) determining the spacing of the position of the target color location from the similar source color location; and e) based on the spacing, changing the source color value correlated with the similar source color location;

further comprising the step of repeating the steps b) through e) until either a predetermined number of repetitions has been reached or the spacing drops below a predetermined error value.

2. The method according to claim 1, wherein the target color locations and the source color locations are determined based on the target color values and the source color values by a spectroscopic method, respectively.

3. The method according to claim 1, wherein, beginning with a first repetition of the steps b) through e), the source color locations of the source color spaces determined in the preceding repetition or preceding repetitions are used.

4. The method according to claim 3, wherein the source color spaces of all preceding repetitions are used.

5. The method according to claim 1, wherein several of the source color locations are determined for the target color location, wherein the source color locations envelopes the target color location, wherein one of the source color locations is the similar source color location.

6. The method according to claim 5, wherein from the source color locations enveloping the target color location a linear combination with linear factors is formed and the linear factors are used for changing the source color value corresponding to the similar source color location.

7. The method according to claim 1, further comprising the step of determining a black content when generating the target color space and the source color space.

8. The method according to claim 7 further comprising the step of representing the color values as a four-dimensional field and the color space as a three-dimensional field, respectively, when the black content is not considered.

9. The method according to claim 7 further comprising the step of representing the color values as a four-dimensional field and the color space as a four-dimensional field, respectively, when the black content is considered.

* * * * *